United States Patent [19]
Asseo et al.

[11] 3,838,836
[45] Oct. 1, 1974

[54] METHOD AND APPARATUS FOR LOAD STABILIZATION IN HEAVY LIFT HELICOPTERS

[75] Inventors: Sabi J. Asseo, Depew; Richard F. Whitbeck, Williamsville, both of N.Y.

[73] Assignee: Calspan Corporation, Buffalo, N.Y.

[22] Filed: Aug. 8, 1973

[21] Appl. No.: 386,809

[52] U.S. Cl. ............................................ 244/137 R
[51] Int. Cl. .............................................. B64d 9/00
[58] Field of Search... 244/137 R, 118 R, 2, DIG. 2; 294/81 R, 74

[56] References Cited
UNITED STATES PATENTS

| | | | |
|---|---|---|---|
| 3,339,966 | 9/1967 | Carlson | 294/81 R |
| 3,510,107 | 5/1970 | Fidler | 244/137 |
| 3,656,796 | 4/1972 | Cook | 294/74 |

*Primary Examiner*—Trygve M. Blix
*Assistant Examiner*—Sherman D. Basinger
*Attorney, Agent, or Firm*—Allen J. Jaffe

[57] ABSTRACT

The external load produced motions in a heavy lift helicopter are stabilized by dynamically stabilizing the load. A three-point suspension system is used to support the load with each of the points being individually movable in response to sensed conditions of the relative motions of the load and helicopter.

8 Claims, 6 Drawing Figures

PATENTED OCT 1 1974
3,838,836
SHEET 1 OF 3
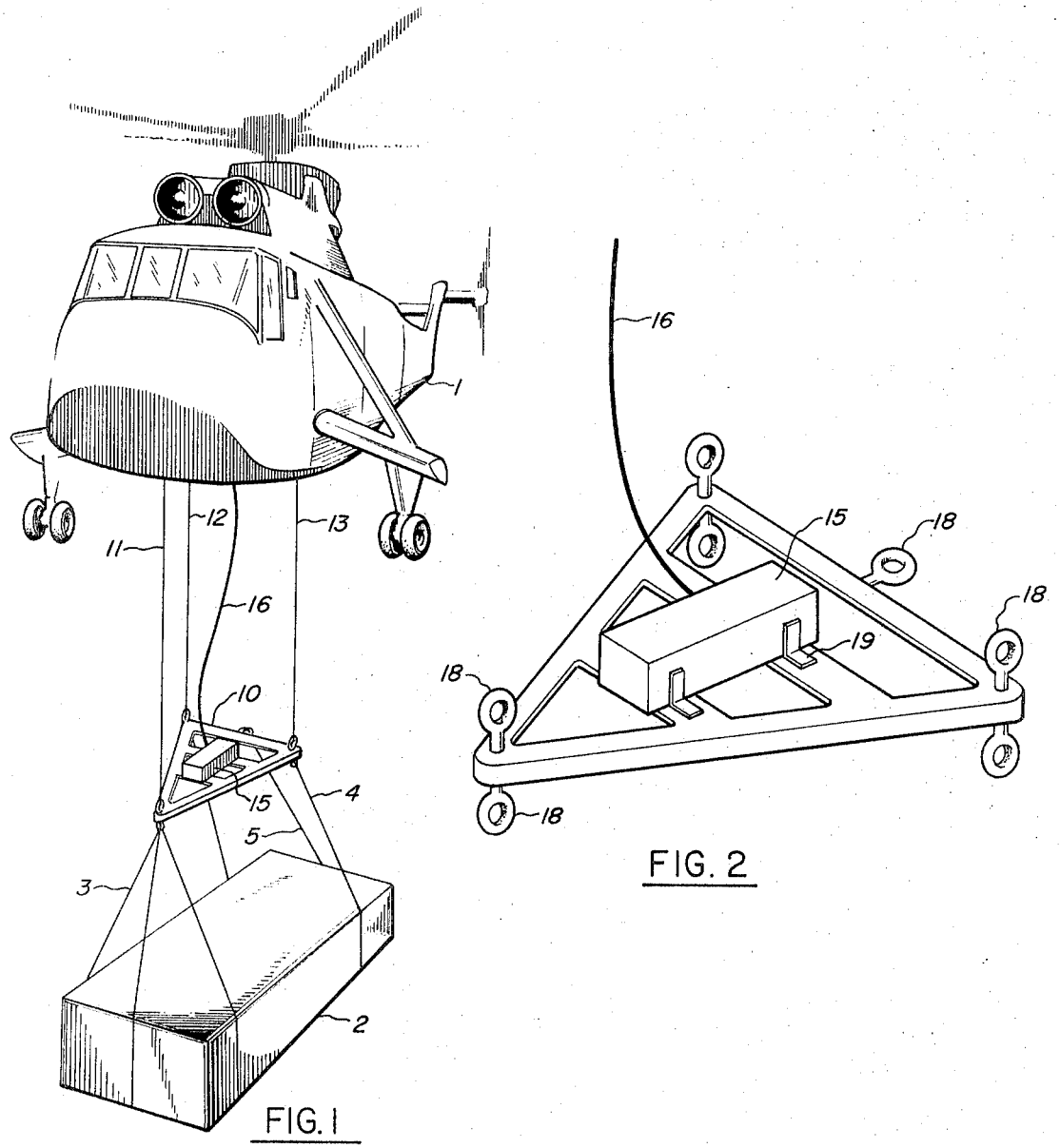
FIG. 1
FIG. 2
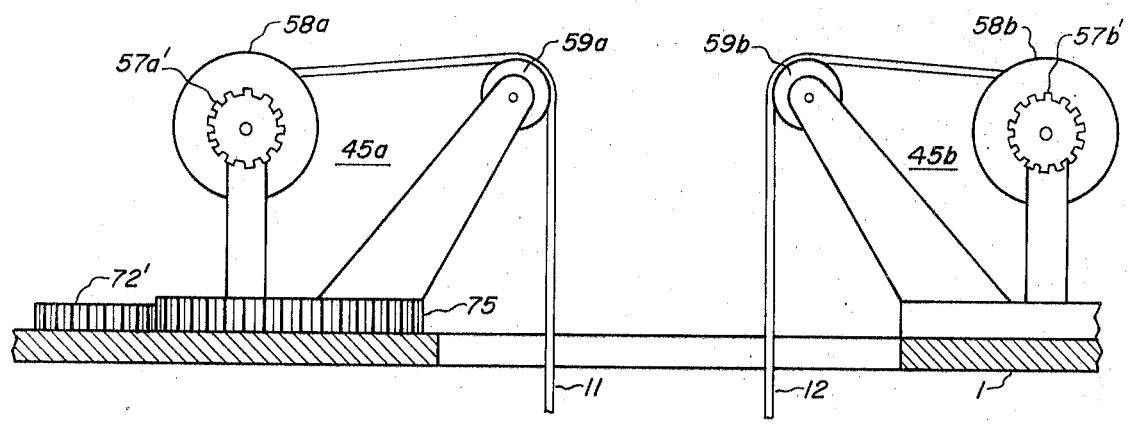
FIG. 6

METHOD AND APPARATUS FOR LOAD STABILIZATION IN HEAVY LIFT HELICOPTERS

The cruising speeds of helicopters transporting externally slung, low density and high drag loads are severely restricted by dangerous load oscillations which have, on occasion, resulted in emergency load jettison and in collisions between the loads and the helicopters. These load oscillations are usually caused by a directional instability of the load which produces periodic yawing which, in turn, excites lateral swinging along with drag variations that ultimately result in a longitudinal pendulum motion.

A single cable suspension system restricts the vertical motion of the load relative to the helicopter. Two longitudinally displaced cables restrict the pitch motion of the load in addition to the vertical motion while three longitudinally and laterally displaced cables restrict the roll motion in addition to the pitch and vertical motions. Hence the total degrees of freedom of the helicopter for one, two and three fixed cables are 11, 10 and 9, respectively. In contrast, a helicopter equipped with winches placed at the corners of an isoceles triangle at the bottom of the helicopter structure, according to this invention, has 12 degrees of freedom, since the load is free to move in 6 degrees of freedom relative to the helicopter. Moving all of the winches in unison raises or lowers the load while differentially moving the fore and aft winches changes the load pitch attitude. Yaw damping is introduced through the roll to yaw coupling of the load by differentially moving the left and right winches which causes the load to roll.

It is an object of this invention to provide a method and apparatus for stabilizing an externally slung load carried by a helicopter.

It is a further object of this invention to provide a method and apparatus for dynamically stabilizing an externally slung load carried by a helicopter. These objects, and others as will become apparent hereinafter, are accomplished by the present invention.

Basically the present invention provides a method of and apparatus for load stabilization for use in a heavy lift helicopter which comprises: supporting each point of a 3-point suspension system by a winch controller means secured to the helicopter; securing a load to the 3-point suspension system; sensing the motion of the helicopter and load; and, controlling each of the winch controller means in response to the sensed motion of the helicopter and load.

BRIEF DESCRIPTION OF THE DRAWINGS

For a fuller understanding of the present invention, reference should now be had to the following detailed description thereof taken in conjunction with the accompanying drawings wherein:

FIG. 1 is a pictorial representation of a helicopter employing the present invention;

FIG. 2 is an isometric view of the triangle spreader beam system;

FIG. 6 is a partial sectional view of the winch controllers.

DESCRIPTION OF THE PREFERRED EMBODIMENT

Figure 3:
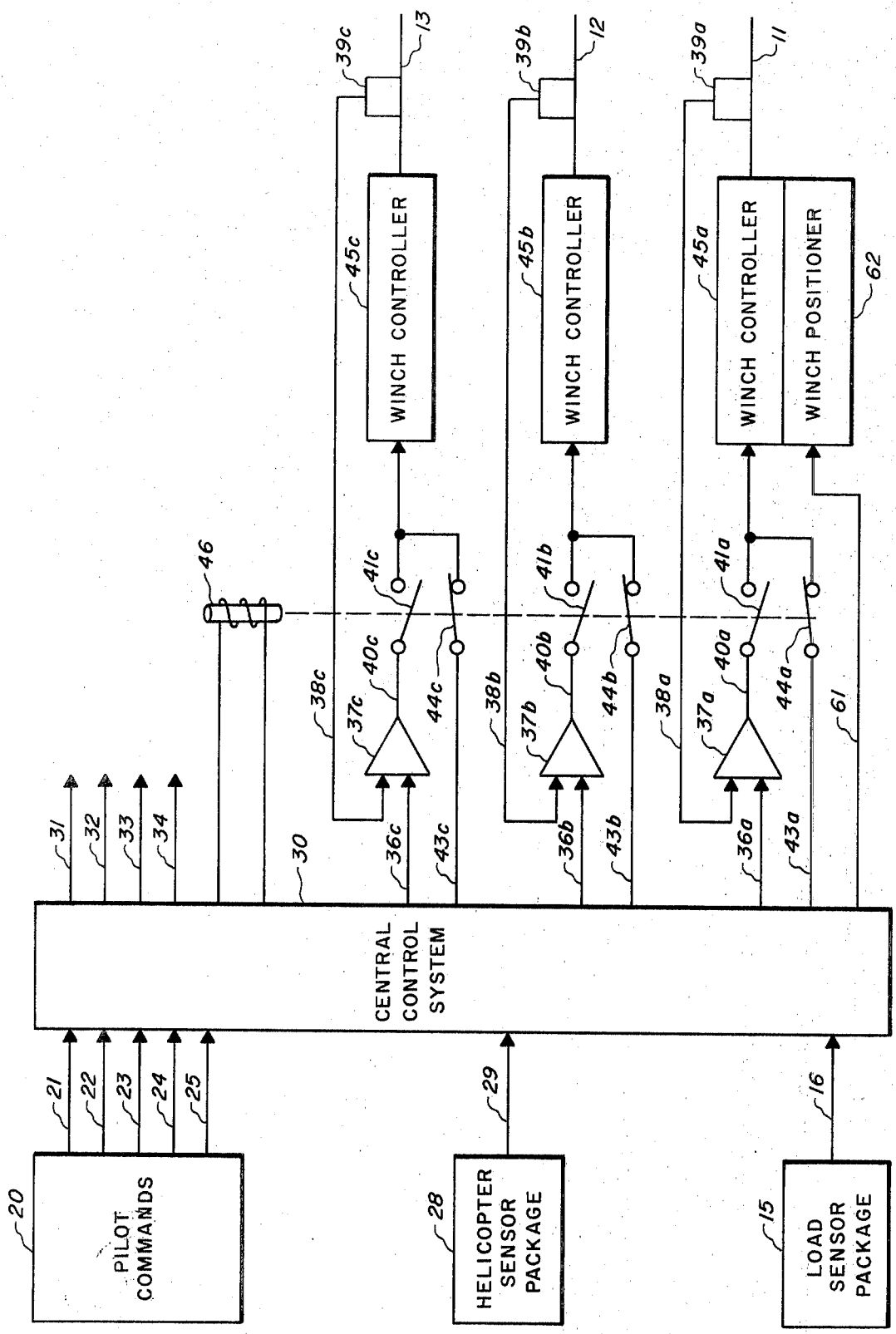
FIG. 3 is a block diagram of the control system of the present invention.

In FIG. 1, a helicopter 1 carries a load 2 which is supported by cables 3, 4 and 5 which are connected to triangle spreader beam system 10. The triangle spreader beam system 10 is connected to helicopter 1 through winch-controlled cables 11, 12 and 13. Beam system 10 keeps the cables 3, 4, 5, 11, 12 and 13 from tangling and provides a base for the mounting of load sensor package 15.

Triangle spreader beam system 10, as best shown in FIG. 2, has a plurality of eyebolts 18, or other conventional structure, for securing cables 3, 4, 5, 11, 12 and 13 thereto. Load sensor package 15 which is mounted on beam system 10 by brackets 19, or other conventional structure, contains an accelerometer, gyroscope, etc., for sensing the motions of beam system 10 and hence load 2. Signals indicative of the load motions sensed by load sensor package 15 are transmitted to central control system 30 by a cable 16 which is preferrably played out from and wound on a drum as the load 2 is lowered and raised, respectively.

In FIG. 3, central control system 30 receives a series of inputs representing the pilot commands 20 and the motions sensed by helicopter sensor package 28 and load sensor package 15. The pilot commands 20 are delivered to central control system 30 in the form of inputs carried by lines 21, 22, 23 and 24 representing the collective, longitudinal cyclic, lateral cyclic and rudder commands, respectively. Central control system 30 blends the pilot command inputs 20 with the feedback signals received from helicopters sensor package 28 via line 29 and from load sensor package 15 via cable 16 to produce a series of control outputs that will activate the conventional helicopter controls and the winch controllers. The control outputs of the central control system 30 which are transmitted via lines 31, 32, 33 and 34 control the helicopter collective pitch, longitudinal cyclic, lateral cyclic and rudder, respectively. Additional control outputs are transmitted by central control system 30 via lines 36a, 36b, 36c, 43a, 43b, 43c and 61.

In the raise and lower mode an additional pilot command input is transmitted to central control system 30 via line 25 and in response thereto relay 46 is energized by central control system 30. When relay 46 is energized, normally open switches 41a, 41b and 41c which are located in lines 40a, 40b and 40c are closed and normally closed switches 44a, 44b and 44c which are located in lines 43a, 43b and 43c are opened. The control signals used to raise and lower the load 2, which are transmitted via lines 36a, 36b and 36c, are supplied as first inputs to operational amplifiers 37a, 37b and 37c. Second inputs are supplied to operational amplifiers 37a, 37b and 37c via lines 38a, 38b and 38c in response to the sensing of the movement of cables 11, 12 and 13 by tachometers 39a, 39b and 39c which may be mounted on winch controllers 45a, 45b and 45c, if desired. The outputs of operational amplifiers 37a, 37b and 37c are transmitted to winch controllers 45a, 45b and 45c via lines 40a, 40b and 40c which contain the now closed switches 41a, 41b and 41c. In the raise and lower mode, winch controllers 45a, 45b and 45c are operated as speed regulators since the control signals supplied to lines 36a, 36b and 36c are speed reference signals.

In the load stabilizing mode, relay 46 is not energized, and therefore switches 41a, 41b and 41c are open and switches 44a, 44b and 44c are closed. As a result, in the load stabilizing mode the control signals supplied to lines 43a, 43b and 43c control winch controllers 45a, 45b and 45c individually and collectively to dynamically stabilize load 2.

Figure 4:
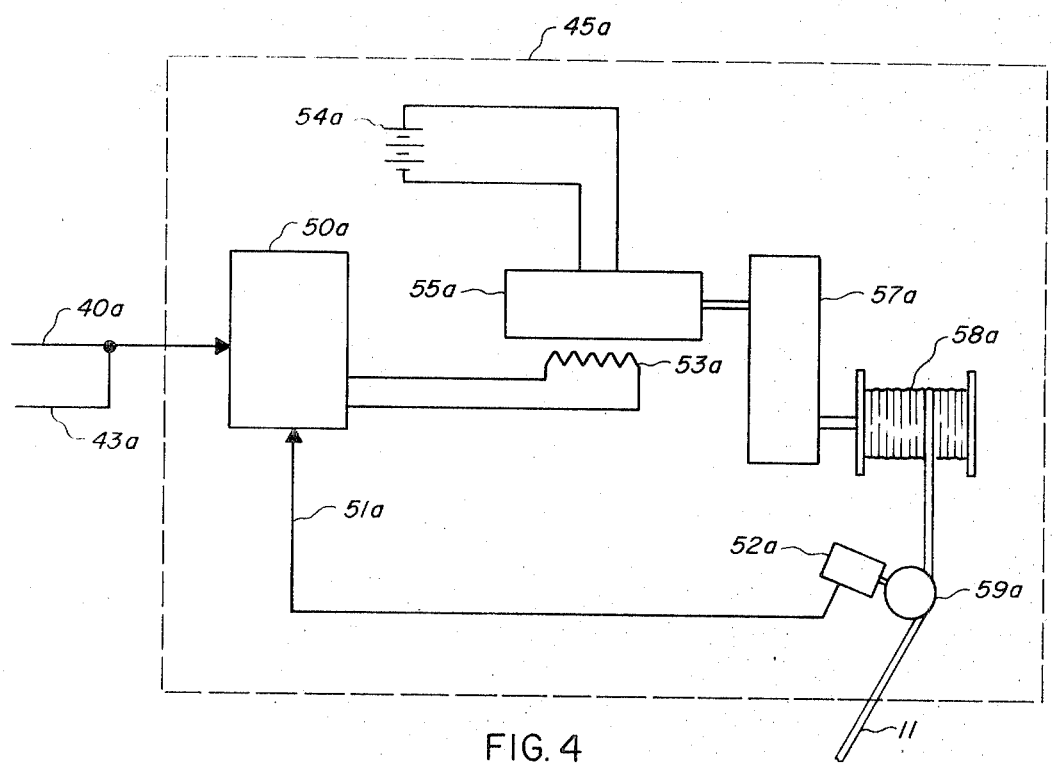
FIG. 4 is a schematic diagram of a winch controller.

Winch controller 45a is connected to the apex of the triangle spreader beam system 10 and is positionable by winch positioner 62 in response to a control signal supplied via line 61 by central control system 30. Except for a movable mounting provided for winch controller 45a, the winch controllers 45a, 45b and 45c are preferably identical in operation and, hence, a description of one will be applicable to all. As shown in FIG. 4, regulator 50a is connected to line 40a and receives as an input either the output of comparator 37a or the reference output signal supplied to line 43a by central control system 30. Regulator 50a is connected to load cell 52a via line 51a and receives as a second input a signal indicative of the tension in cable 11 as sensed by load cell 52a. In response to input signals supplied to regulator 50a via lines 40a and 51a, regulator 50a controls the motor field 53a and thereby winch motor 55a. The armature of winch motor 55a is supplied from a source of D.C. current 54a. Winch motor 55a is connected to drum 58a through gear box 57a. Cable 11 is played out from and wound on drum 58a in response to the activation of winch motor 55a and is guided by pulley 59a.

Figure 5:
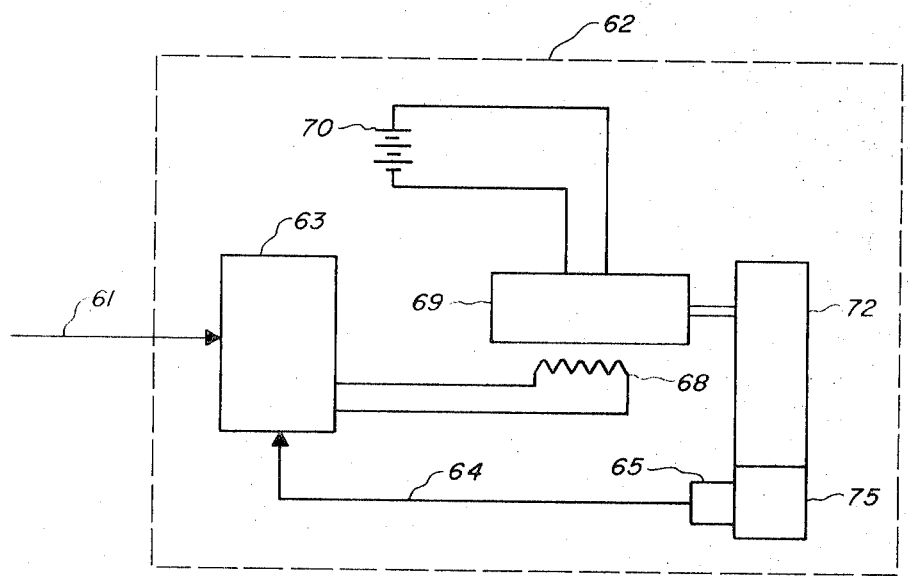
FIG. 5 is a schematic diagram of the winch positioner.

As shown in FIG. 5, regulator 62 receives the control signal supplied via line 61 as a first input. Winch position indicator 65 senses the position of winch controller 45a and gives a feedback signal which is transmitted via line 64 as a second input signal to regulator 63. In response to the input signals supplied to regulator 63 via lines 61 and 64, regulator 63 controls the motor field 68 and thereby winch positioner motor 69. The armature of winch positioner motor 69 is supplied from a source of D.C. current 70. Winch positioner motor 69 is connected to the geared base 75 of winch controller 45a through gear box 72.

As shown in FIG. 6, the winch controllers are identical except that the base 75 of winch controller 45a is formed as a gear for engagement with gear 72' which forms a part of gear box 72. Winch controller 45a may, therefore, be moved by winch positioner motor 69 through a gear train which includes the gears of gear box 72 and the geared base 75. The playing out and winding up of cables 11 and 12 are controlled through gears 57a' and 57b' which form a part of gear boxes 57a and 57b, respectively. The playing out and winding up of cable 13 will be accomplished by identical structure, not illustrated.

OPERATION

In response to pilot commands 20 and feedback signals received from the helicopter sensor package 28 and the load sensor 15, central control system 30 produces a series of control outputs that will activate the conventional helicopter controls and the winch controllers. The control outputs of the central control system 30 which are transmitted via lines 31, 32, 33 and 34 control the helicopter collective pitch, longitudinal cyclic, lateral cyclic and rudder, while the control outputs transmitted via lines, 61, 43a (or 36a), 43b (or 36b) and 43c (or 36c) control the front helicopter cable attachment point winch positioner 62 and the three winch controllers 45a, 45b 45and 45c, respectively. An additional pilot command input for raising and lowering the load 2 is transmitted to central control system 30 via line 25 and causes the actuation of relay 46. Relay 46 controls the ganged normally open switches 41a, 41b and 41c and normally closed switches 44a, 44b and 44c and thereby the control signals supplied to the winch controllers 45a, 45b and 45c.

Speed reference control signals are transmitted by central control system 30 via lines 36a, 36b and 36c to serve as first inputs to operational amplifiers 37a, 37b and 37c. Second input signals representing the sensed cable movement determined by tachometers 39a, 39b and 39c are transmitted via lines 38a, 38b and 38c. When relay 46 is actuated, switches 41a, 41b and 41c are closed and switches 44a, 44b and 44c are opened and, therefore, the outputs of operational amplifiers 37a, 37b and 37c are transmitted via lines 40a, 40b and 40c to winch controllers 45a, 45b and 45c which are then controlled as speed regulators. When relay 46 is not actuated, and, therefore, switches 41a, 41b and 41c are open and switches 44a, 44b and 44c are closed, the control output signals supplied by central control system 30 to lines 43a, 43b and 43c are transmitted to winch controllers 45a, 45b and 45c for the selective control thereof so as to stabilize the load 2.

Because winch controllers 45a, 45b and 45c are identical in operation, only winch controller 45a will be described. A first input signal is supplied to regulator 50a via line 40a and will be the output of operational amplifier 37a, if relay 46 has been actuated in response to a pilot command, and will control the raising and lowering of load 2. If relay 46 has not been actuated, the control output signal supplied by central control system 30 to line 43a will be supplied to regulator 50a as the first input signal and will cause the stabilizing of load 2 by the selective positioning of spreader beam system 10. The control output signal supplied via line 43a is in response to feedback signals supplied to the central control system 30 by helicopter sensor package 28 and load sensor package 15. A second input signal is supplied to regulator 50a via line 51a and represents the tension in cable 11 as determined by load cell 52a. Regulator 50a controls the motor field 53a for the winch motor 55a and thereby controls the winding and unwinding of cable 11 to raise, lower or stabilize the load 2.

A reference output signal is supplied to winch positioner 62 via line 61 by central control system 30 in response to feedback signals supplied by helicopter sensor package 28 and load sensor package 15. Regulator 63 receives the signal supplied via line 61 as a first input. Winch position indicator 65 supplies a second input signal indicative of the position of winch controller 45a via line 64. Regulator 63 controls the motor field for motor 69 which is connected to the geared base 75 of winch controller 45a through gear box 72 for positioning the geared base 75 and thereby winch controller 45a.

In the practice of the present invention, the central control system can be an analog computer, analog blocks made up of RC networks and operational amplifiers or any other suitable conventional structure. The winch controllers may be dissimilar in type or operation, they may be mounted externally of the helicopter, the movement of the winch controller may take place on a track in the manner of a overhead crane or the geared portion of the winch controller base may only be a sector of a gear and/or of a noncircular configuration.

The cable tension may be regulated by measuring the armature current which is approximately proportional to cable tension and using a tension regulator instead of a load cell. Instead of controlling the tension or armature current by motor field current, it is also possible to use a separate D.C. source for each motor. The D.C. source can be a solid state amplifier or a rotating motor-generator set and the cable tension or armature current would be controlled in proportion to the motor armature voltage.

Other means for controlling the position of the winch controller include measuring the speed of the cable by a tachometer and integrating. Additionally, a D.C. source can be used to control the armature voltage the same as for tension regulation.

Although the preferred embodiment of the present invention has been described and illustrated, other changes will occur to those skilled in the art. It is therefore intended that the scope of the present invention is to be limited only by the scope of the appended claims.

We claim:

1. A method of load stabilization for use in a pilot commanded heavy lift helicopter carrying an externally slung load including the steps of:
   supporting each point of a 3-point suspension system by a respective one of three winch controller means secured to the helicopter;
   securing a load to the 3-point suspension system;
   sensing the motion of the helicopter and load;
   sensing pilot command signals; and
   controlling each of the winch controller means in response to the sensed motion of the helicopter and load and the pilot command signals, whereby the 3-point suspension system is positioned to dynamically stabilize the load under conditions tending to produce load oscillations.

2. The method of claim 1 further including the step of operating said winch controller means as speed regulators to raise and lower the load.

3. The method of claim 1 further including the step of moving one of said winch controller means with respect to the helicopter in response to the sensed motion of the helicopter and load.

4. Apparatus for load stabilization in a heavy lift helicopter comprising:
   three winch controller means secured to and supported by said helicopter;
   a 3-point suspension system supported at each point by a respective one of said winch controller means;
   means for securing a load to said 3-point suspension system;
   pilot actuated helicopter control means for transmitting pilot command signals indicative of desired helicopter operation;
   instrument means for sensing helicopter motion and transmitting signals indicative thereof;
   instrument means for sensing load motion and transmitting signals indicative thereof;
   central control means for receiving and blending the pilot command signals and the signals indicative of the helicopter motion and the load motion and, responsive thereto, transmitting control signals for controlling the flight of the helicopter and the operation of the winch controller means whereby the 3-point suspension system is positioned to dynamically stabilize the load.

5. The apparatus of claim 4 wherein said central control means include means for selectively operating said winch controller means to raise or lower the load or to dynamically stabilize the load.

6. The apparatus of claim 5 wherein said means for selectively operating said winch controller means includes a relay actuated in response to one of said pilot command signals for selectively supplying either of two sets of the control signals to the winch controller means.

7. The apparatus of claim 6 further comprising means for repositioning one of said winch controller means relative to said helicopter in response to one of said control signals.

8. The apparatus of claim 4 further comprising means for repositioning one of said winch controller means relative to said helicopter in response to one of said control signals.

* * * * *